US012753452B2

(12) United States Patent
Tsvik et al.

(10) Patent No.: US 12,753,452 B2
(45) Date of Patent: Oct. 6, 2026

(54) METHOD FOR MANUFACTURING DIRECT REDUCED IRON AND DRI MANUFACTURING EQUIPMENT

(71) Applicant: ArcelorMittal, Luxembourg (LU)

(72) Inventors: George Tsvik, Valparaiso, IN (US); Dmitri Boulanov, East Chicago, IN (US); Jon Reyes Rodriguez, Aviles Asturias (ES); Odile Carrier, Metz (FR); Sarah Salame, Maizieres les Metz (FR); José Barros Lorenzo, Maizieres les Metz (FR); Marcelo Andrade, East Chicago, IN (US); Dennis Lu, East Chicago, IN (US)

(73) Assignee: ArcelorMittal, Luxembourg (LU)

( * ) Notice: Subject to any disclaimer, the term of this patent is extended or adjusted under 35 U.S.C. 154(b) by 308 days.

(21) Appl. No.: 18/559,908

(22) PCT Filed: May 18, 2021

(86) PCT No.: PCT/IB2021/054256
§ 371 (c)(1),
(2) Date: Nov. 9, 2023

(87) PCT Pub. No.: WO2022/243725
PCT Pub. Date: Nov. 24, 2022

(65) Prior Publication Data
US 2024/0240276 A1 Jul. 18, 2024

(51) Int. Cl.
*C21B 13/02* (2006.01)
*C21B 13/00* (2006.01)
(Continued)

(52) U.S. Cl.
CPC .......... *C21B 13/02* (2013.01); *C21B 13/0073* (2013.01); *F27B 1/10* (2013.01);
(Continued)

(58) Field of Classification Search
CPC .. C21B 13/0073; C21B 13/02; C21B 2100/44
See application file for complete search history.

(56) References Cited

U.S. PATENT DOCUMENTS 3,853,538 A 12/1974 Nemeth et al.
4,333,761 A 6/1982 Ahrendt et al.
(Continued)

FOREIGN PATENT DOCUMENTS

CN 101701274 A 5/2010
CN 101768651 A 7/2010
(Continued)

OTHER PUBLICATIONS

Dutta, Sujay Kumar, and Rameshwar Sah. "Direct reduced iron: Production." Encyclopedia of Iron, Steel, and Their Alloys (2016): 1082-1108.*
(Continued)

*Primary Examiner* — Jessee R Roe
(74) *Attorney, Agent, or Firm* — Davidson Kappel LLC

(57) ABSTRACT

A method for manufacturing Direct Reduced Iron wherein iron ore is reduced in a DRI shaft by a reducing gas including hydrogen obtained by thermal cracking of methane inside a plasma torch, the reducing gas further including top gas coming from the DRI shaft and a DRI manufacturing equipment including a DRI shaft (1) and a plasma torch (40), wherein the plasma torch is connected on one side to a methane supply (41) and, on the other side, to the DRI shaft (1), the DRI shaft being provided with a recycling loop allowing to inject its top gas back in the DRI shaft.

7 Claims, 2 Drawing Sheets

(51) Int. Cl.
*F27B 1/10* (2006.01)
*F27D 17/20* (2025.01)

(52) U.S. Cl.
CPC .......... *F27D 17/20* (2025.01); *C21B 2100/26* (2017.05); *C21B 2100/44* (2017.05)

(56) References Cited

U.S. PATENT DOCUMENTS

| | | | |
|---|---|---|---|
| 4,564,389 | A | 1/1986 | Yamaoka et al. |
| 4,606,761 | A | 8/1986 | De Waal et al. |
| 5,676,732 | A | 10/1997 | Viramontes-Brown et al. |
| 6,478,841 | B1 | 11/2002 | Faccone et al. |
| 7,767,191 | B2 | 8/2010 | Thomas et al. |
| 7,931,731 | B2 | 4/2011 | Van Heeringen et al. |
| 8,551,213 | B2 | 10/2013 | Tateishi et al. |
| 8,940,076 | B2 | 1/2015 | Duarte-Escareno et al. |
| 9,377,242 | B2 | 6/2016 | Millner et al. |
| 2011/0209576 | A1 | 9/2011 | Roth et al. |
| 2012/0031232 | A1 | 2/2012 | Huang et al. |
| 2012/0031236 | A1 | 2/2012 | Roth et al. |
| 2012/0174710 | A1 | 7/2012 | Millner et al. |
| 2015/0259759 | A1 | 9/2015 | Wolfmeir et al. |
| 2015/0329931 | A1 | 11/2015 | Eder et al. |
| 2015/0345869 | A1 | 12/2015 | Millner et al. |
| 2016/0002744 | A1 | 1/2016 | Becerra-Novoa et al. |
| 2016/0083810 | A1 | 3/2016 | Kuhl et al. |
| 2016/0083811 | A1 | 3/2016 | Motamedhashemi et al. |
| 2017/0002433 | A1 | 1/2017 | Kuhl et al. |
| 2017/0298461 | A1 | 10/2017 | Eder et al. |
| 2018/0155191 | A1 | 6/2018 | Szego et al. |
| 2018/0363075 | A1 | 12/2018 | Holzleithner et al. |
| 2018/0371560 | A1 | 12/2018 | Zendejas-Martinez et al. |
| 2021/0123110 | A1 | 4/2021 | Krueger et al. |
| 2022/0235426 | A1 | 7/2022 | Duarte et al. |

FOREIGN PATENT DOCUMENTS

| | | | |
|---|---|---|---|
| CN | 102031323 | A | 4/2011 |
| CN | 102392093 | A | 3/2012 |
| EP | 2574683 | A1 | 4/2013 |
| EP | 3156519 | A1 | 4/2017 |
| JP | S62247036 | A | 10/1987 |
| JP | 2002161303 | B2 | 6/2002 |
| JP | 2012506955 | A | 3/2012 |
| JP | 2012522889 | A | 9/2012 |
| JP | 2015532948 | A | 11/2015 |
| JP | 2016524654 | A | 8/2016 |
| RU | 2285047 | C1 | 10/2006 |
| UA | 74467 | C2 | 12/2005 |
| UA | 79476 | C2 | 6/2007 |
| WO | WO 2011029792 | | 3/2011 |
| WO | WO 2012059255 | A1 | 5/2012 |
| WO | WO 2013064870 | A1 | 5/2013 |
| WO | WO 2014126631 | A2 | 8/2014 |
| WO | WO 2020245070 | A1 | 12/2020 |
| WO | WO 2022/254278 | A1 | 5/2022 |
| WO | WO 2022/243724 | A1 | 11/2022 |
| WO | WO 2022/243725 | A1 | 11/2022 |
| WO | WO2022243726 | A1 | 11/2022 |
| WO | WO 2022248914 | A1 | 12/2022 |
| WO | WO 2022248987 | A1 | 12/2022 |

OTHER PUBLICATIONS

WO 2022/243724 A1—PCT/IB2021/054252, Nov. 24, 2022, In English, filed as U.S. Appl. No. 18/559,905, filed Nov. 9, 2023.

WO 2022/243725 A1—PCT/IB2021/054256, Nov. 24, 2022, In English, filed as U.S. Appl. No. 18/559,908, filed Nov. 9, 2023.

WO2022243726 A1—PCT/IB2021/054259, Nov. 24, 2022, In English, filed as U.S. Appl. No. 18/559,909, filed Nov. 9, 2023.

WO 2022248987 A1—PCT/IB2022/054664, Dec. 1, 2022, In English, filed as U.S. Appl. No. 18/290,078, filed Nov. 9, 2023.

WO 2022248914 A1—PCT/IB2021/054581, Dec. 1, 2022, In English, filed as U.S. Appl. No. 18/559,901, filed Nov. 9, 2023.

WO 2022/254278 A1—PCT/IB2022/054679, May 19, 2022, In English, filed as U.S. Appl. No. 18/290,551, filed Nov. 14, 2023.

International Search Report of PCT/IB2021/054252 dated Jan. 24, 2022.

International Search Report of PCT/IB2021/054256 dated Jan. 24, 2022.

International Search Report of PCT/IB2021/054259 dated Jan. 25, 2022.

International Search Report of PCT/IB2022/054664 dated Feb. 8, 2022.

International Search Report of PCT/IB2021/054581 dated Jan. 27, 2022.

International Search Report of PCT/IB2022/054679 dated Feb. 8, 2022.

DI Doris Wall; Export Gases and their Utilization Potential; pp. 1-171, in particular Abstract, p. 56 et seq., and p. 115 et seq.; 2012; Montanuniveristat Leoben; Leoben.

Vijeta Arora, Rishabh Kumar Saran, Raj Kumar, and Shashikant Yadav; Separation and sequestration of C02 in Geological formations; pp. 647-656, in particular Abstract and p. 1, Introduction; 2019; Materials Science for Energy Technologies 2.

Stefan Schlueter and Christian Geitner; Simulation of Methanol and Urea Production from Catalytic Conversion of Steel Mill Gases; pp. 1-14, in particular Abstract and p. 1, Introduction; 2020; Chemie Ingenieur Technik.

U.S. Department of the Interior; "National Assessment of Geologic Carbon Dioxide Storage Resources—Results", U.S. Geological Survey, 2013, 54 Pages, Circular 1386, Version 1.1.

U.S. Department of the Interior; "The Concept of Geologic Carbon Sequestration," U.S. Geological Survey,2011, 2 Pages, FactSheet2010-3122.

Gooya,R., et al; "Unstable, Super Critical C02—Water Displacement in Fine Grained Porous Media under Geologic Carbon Sequestration Conditions", Scientific Reports, 2019, pp. 1-9, vol. 9:11272.

* cited by examiner

METHOD FOR MANUFACTURING DIRECT REDUCED IRON AND DRI MANUFACTURING EQUIPMENT

The invention is related to a method for manufacturing Direct Reduced Iron (DRI) and to a DRI manufacturing equipment.

BACKGROUND

Steel can be currently produced through two main manufacturing routes. Nowadays, the most commonly used production route consists in producing pig iron in a blast furnace, by use of a reducing agent, mainly coke, to reduce iron oxides. In this method, approx. 450 to 600 kg of coke, is consumed per metric ton of pig iron; this method, both in the production of coke from coal in a coking plant and in the production of the pig iron, releases significant quantities of $CO_2$.

The second main route involves so-called "direct reduction methods". Among them are methods according to the brands MIDREX, FINMET, ENERGIRON/HYL, COREX, FINEX etc., in which sponge iron is produced in the form of HDRI (hot direct reduced iron), CDRI (cold direct reduced iron), or HBI (hot briquetted iron) from the direct reduction of iron oxide carriers. Sponge iron in the form of HDRI, CDRI, and HBI usually undergo further processing in electric arc furnaces.

There are three zones in each direct reduction shaft with cold DRI discharge: Reduction zone at top, transition zone at the middle, cooling zone at the cone shape bottom. In hot discharge DRI, this bottom part is used mainly for product homogenization before discharge.

Reduction of the iron oxides occurs in the upper section of the furnace, at temperatures up to 950° C. Iron oxide ores and pellets containing around 30% by weight of Oxygen are charged to the top of a direct reduction shaft and are allowed to descend, by gravity, through a reducing gas. This reducing gas is entering the furnace from the bottom of reduction zone and flows counter-current from the charged oxidized iron. Oxygen contained in ores and pellets is removed in stepwise reduction of iron oxides in counter-current reaction between gases and oxide. Oxidant content of gas is increasing while gas is moving to the top of the furnace.

The reducing gas generally comprises hydrogen and carbon monoxide (syngas) and is obtained by the catalytic reforming of natural gas. For example, in the so-called MIDREX method, first methane is transformed into a reformer according to the following reaction to produce the syngas or reduction gas:

$$CH4 + CO2 \text{ -> } 2CO + 2H2$$

and the iron oxide reacts with the reduction gas, for example according to the following reactions:

$$3Fe203 + CO/H2 \text{ -> } 2Fe3O4 + CO2/H2O$$

$$Fe3O4 + CO/H2 \text{ -> } 3\ FeO + CO2/H2O$$

$$FeO + CO/H2 \text{ -> } Fe + CO2/H2O$$

At the end of the reduction zone the ore is metallized.

A transition section is found below the reduction section; this section is of sufficient length to separate the reduction section from the cooling section, allowing an independent control of both sections. In this section carburization of the metallized product happens. Carburization is the process of increasing the carbon content of the metallized product inside the reduction furnace through following reactions:

$$3Fe + CH4 \rightarrow Fe3C + 2H2 \text{ (Endothermic)}$$

$$3Fe + 2CO \rightarrow Fe3C + CO2 \text{ (Exothermic)}$$

$$3Fe + CO + H2 \rightarrow Fe3C + H2O \text{ (Exothermic)}$$

Injection of natural gas in the transition zone is using sensible heat of the metallized product in the transition zone to promote hydrocarbon cracking and carbon deposition. Due to relatively low concentration of oxidants, transition zone natural gas is more likely to crack to $H_2$ and Carbon than reforming to $H_2$ and CO. Natural gas cracking provides carbon for DRI carburization and, at the same time adds reductant ($H_2$) to the gas that increases the gas reducing potential.

SUMMARY OF THE INVENTION

In view of the considerable increase in the concentration of $CO_2$ in the atmosphere since the beginning of the last century and the subsequent greenhouse effect, it is essential to reduce emissions of $CO_2$ where it is produced in a large quantity, and therefore in particular during DRI manufacturing.

As explained above, it is known to use a reducing gas produced by chemically reforming a mixture of methane and top gas from the reducing furnace to produce a gas rich in hydrogen and carbon monoxide. The mixture flows through catalyst tubes where it is converted into a gas comprising hydrogen and carbon monoxide. However, such process is highly endothermic and requires the use of catalysts, which is usually $Ni/Al_2O_3$ that must be used at high temperatures, above 1100 K. Moreover, the catalysts are very sensible to impurities which can poison them and reduce drastically the yield of such chemical reforming process.

Based on the above, there is a need for a method of manufacturing Direct Reduced Iron that is $CO_2$-neutral, environmentally friendly and easy to implement, while showing a good yield.

The present invention provides a method for manufacturing Direct Reduced Iron wherein iron ore is reduced in a DRI shaft by a reducing gas comprising hydrogen obtained by thermal cracking of methane inside a plasma torch, said reducing gas further comprising top gas coming from said DRI shaft.

The method of the invention may also comprise the following optional characteristics considered separately or according to all possible technical combinations:

- the hydrogen is mixed with said top gas before being injected in said DRI shaft,
- the reduction gas is being heated after mixing of the top gas with said hydrogen,
- the heating of the reducing gas is being done by using $CO_2$ neutral electricity,
- the reducing gas is being injected in the DRI shaft in its reduction section, the top gas coming from said DRI shaft is being scrubbed to remove water before being added to said reducing gas, the ratio of top gas to hydrogen is set from 5:1 to 1:5, the carbon content of the Direct Reduced Iron is set from 0.5 to 5 wt. %.

In the frame of the present invention, Direct Reduced Iron covers so-called DRI, but also hot briquetted iron (HBI), Cold Direct Reduced iron (CDRI) and Hot Direct Reduced Iron (HDRI). Such material can be later used in different processes, like, for example, processes to produce pig iron in a blast furnace or steel in a BOF or in an electric arc furnace. It can be also used as a combustible or as an electrode in a battery.

The invention is also related to a DRI manufacturing equipment including a DRI shaft and a plasma torch, wherein said plasma torch is connected on one side to a methane supply and, on the other side, to said DRI shaft, said DRI shaft being provided with a recycling loop allowing to inject its top gas back in said DRI shaft.

The equipment may also comprise the following optional characteristics considered separately or according to all possible technical combinations:

a mixer can be connected on one side to the outlet of said plasma torch and to the top of the DRI shaft and, on the other side to said DRI shaft, heating means can be provided for the mixer, said heating means being powered by $CO_2$ neutral electricity, said mixer can be connected to the reduction section of said DRI shaft, a scrubber can be connected to the top gas outlet of said DRI shaft.

BRIEF DESCRIPTION OF THE DRAWINGS

Other characteristics and advantages of the invention will emerge clearly from the description of it that is given below by way of an indication and which is in no way restrictive, with reference to the appended figures in which.

DETAILED DESCRIPTION

Elements in the figures are illustration and may not have been drawn to scale.

Figure 1:
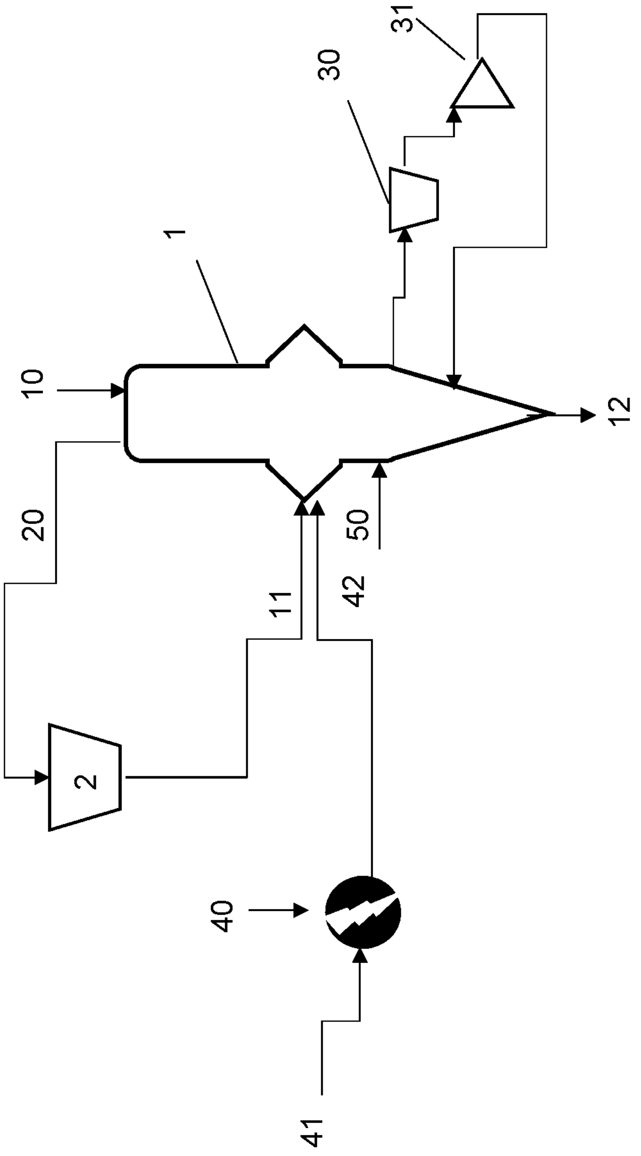
FIG. 1 illustrates a DRI manufacturing equipment according to the invention.

FIG. 1 is a schematic view of a DRI manufacturing equipment according to the invention. The DRI manufacturing equipment includes a DRI shaft 1 comprising from top to bottom an inlet for iron ore 10 that travels through the shaft by gravity, a reduction section located in the mid-part of the shaft, a cooling section located at the bottom and an outlet 12 from which the direct reduced iron is finally extracted.

On top of the shaft, the top gas exiting the DRI shaft is collected in a pipe 20 which is connected to the DRI shaft 1, creating thereby a recycling loop for such top gases to be reinjected back in the DRI shaft. The gases are travelling up to the bottom, in counter-current towards the flow of iron ore.

In a preferred embodiment, the top gas can be reinjected in the reduction section of the DRI shaft through a pipe 11.

The DRI manufacturing equipment further comprises a plasma torch 40 which is connected on one side to a methane supply 41 and, on the other side, to the DRI shaft 1 by a connecting pipe 42.

A plasma torch is a device for generating a directed flow of plasma. Thermal plasmas can be generated in plasma torches by applying electric energy to a gas. The electric energy can be direct current, alternating current, radio-frequency or other types of discharges. In a direct current torch, an electric arc is formed between the electrodes, which can be made for example of copper, tungsten, graphite or silver. The thermal plasma is formed from the input of gas, projecting outward as a plasma jet.

The most commonly used plasma types are dielectric barrier discharges, microwave and gliding arc plasmas. Dielectric barrier discharges are created by applying an electric potential difference between two electrodes, of which at least one is covered by a dielectric barrier. They typically operate at room temperature and are called cold plasmas.

Microwave and gliding arc plasmas operate at higher temperatures (typically 1000-3000 K) and are therefore called warm plasmas.

In the frame of the invention, the plasma can be created by using methane as the plasmagenic gas, allowing the non-oxidative conversion of $CH_4$ into hydrogen and solid carbon. Methane is transformed into an ionized gas, consisting of various chemically active species, like radicals, ions, excited atoms and molecules, and electrons. The electrons in the plasma absorb the applied electric energy and activate the molecules by excitation, ionization, and dissociation, creating the above-mentioned reactive species, which can further react to form new molecules. This allows chemical conversions to occur.

It is also possible to initiate a plasma with the use of another gas and to introduce methane in a second step in such plasma to get it transformed as described above.

The man skilled in the art knows how to control the quality of the plasma as a function of the gas pressure and the torch input power. In a preferred embodiment, the specific energy input (SEI, i.e., ratio of plasma power over gas flow rate) is ranging from 0.1 to 500 KJ $l^{-1}$, preferably from 100 to 400 KJ $l^{-1}$, allowing to reach a conversion rate of methane to hydrogen of 50 to vol 99%, preferably of 70 to vol 99%.

Plasma is very flexible and can easily be switched on/off, so it can use intermittently produced $CO_2$ neutral electricity from renewable sources, which cannot be stored on the grid.

$CO_2$ neutral electricity from renewable source is defined as energy that is collected from renewable resources, which are naturally replenished on a human timescale, including sources like sunlight, wind, rain, tides, waves, and geothermal heat.

In an embodiment, whenever hydrogen coming from the cracking of methane is not produced in a sufficient amount, due for example to the partial unavailability of electricity from renewable sources, an additional supply of hydrogen can be injected in the reduction section of the DRI shaft.

The DRI manufacturing equipment may further comprise a scrubber 2 located on the top gas outlet of the DRI shaft, before the reinjection into the shaft 1. The top gas exiting from the DRI shaft usually comprises $H_2$, CO, $CH_4$, $H_2O$, $CO_2$ and $N_2$ in various proportions. The top gas scrubbing operation allows removing water vapor from the rest of the stream to improve its reduction potential.

In a preferred embodiment, after scrubbing, the top gas comprises from 40 to 75 vol % of $H_2$, from 0 to 30 vol % of carbon monoxide CO, from 0 to 10 vol % of methane $CH_4$, from 0 to 25 vol % of carbon dioxide $CO_2$, up to 5 vol % of $H_2O$, the remainder being nitrogen $N_2$. It is preferred to have, after scrubbing, a ratio of $H_2/N_2$ from 1.5 to 3 in such top gas.

Once the top gas exits the scrubber 2, it can optionally be compressed and/or reheated before its reinjection in the DRI shaft through the connecting pipe 11. In a preferred embodiment, its temperature is set to a range from 700° C. to 1000° C., preferably from 800 to 1000° C.

To increase the carbon content of the Direct reduced Iron, an additional source of carbon can be injected in the transition section 50 and/or in the cooling section of the shaft 1. Such additional source of carbon can be in a gaseous form and/or in a solid form and can, for example, consists of biogas and/or of bio-coal. It is also possible to use the solid carbon formed as a by-product of the plasma conversion of methane as such additional source of carbon or even as the sole source of carbon to set the carbon content of the Direct reduced Iron.

A biogas is a renewable energy source that can be obtained by the breakdown of organic matter in the absence of oxygen inside a closed system called bioreactor. Biogas can be produced from raw materials such as agricultural waste, manure, municipal waste, plant material, sewage, green waste, food waste or any biodegradable materials.

A bio-coal is a carbon-neutral fuel that can replace fossil coal in industrial processes. It is produced by pyrolysis and carbonization of biomass performed within controlled temperature and residence time conditions. Thermal conversion of biomass, which is done under oxygen-free conditions process, allows to remove volatile organic compounds and cellulose components from the feedstock and create a solid biofuel with characteristics like the ones in fossil coal.

In a preferred embodiment, the carbon content of the Direct Reduced Iron is set from 0.5 to 5 wt. %, preferably from 1 to 3 wt. % or from 2 to 3 wt. %, which allows getting a Direct Reduced Iron that can be easily handled and that keeps a good combustion potential and a good level of passivation for its future use.

The DRI manufacturing equipment may further comprise a recycling loop in the cooling section that allows extracting part of the gas present at that level to send it in a scrubber 30 and then in a compression unit 31 before reinjecting it in the shaft 1.

Figure 2:
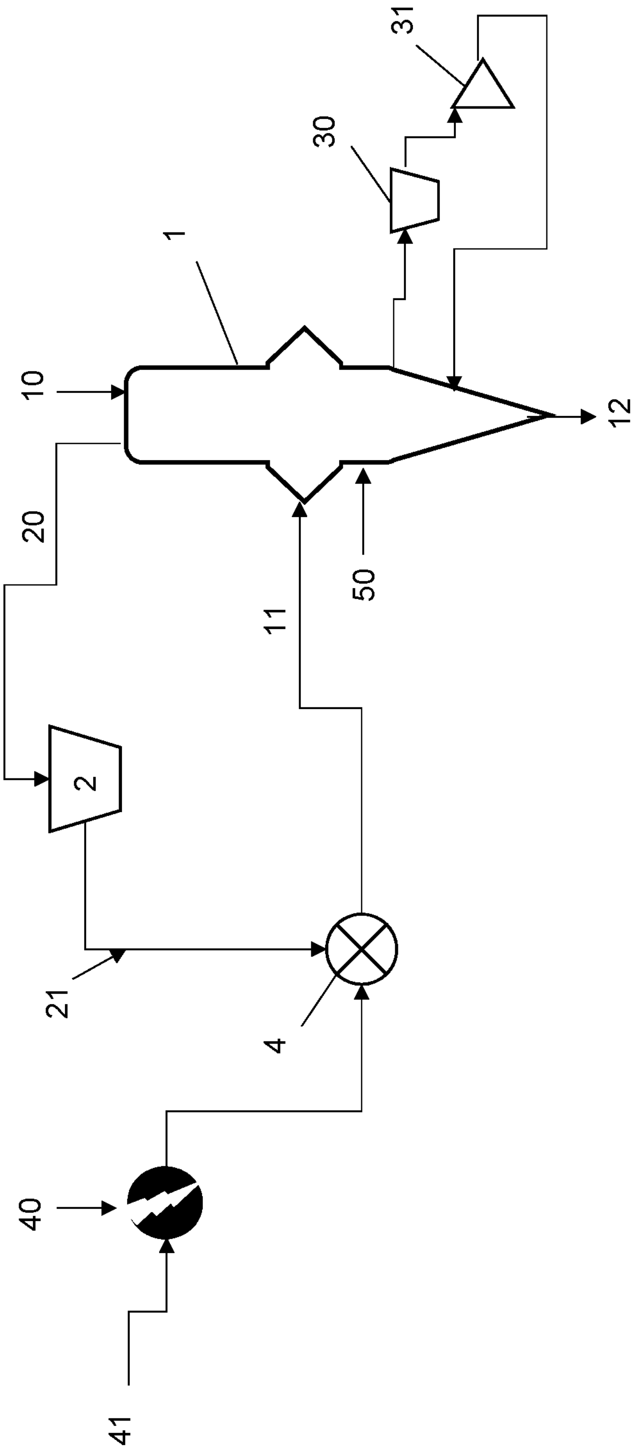
FIG. 2 illustrates a preferred embodiment of a DRI manufacturing equipment according to the invention.

FIG. 2 is showing a schematic DRI manufacturing equipment according to another embodiment of the invention. On top of the shaft, the top gas exiting the DRI shaft is collected in a pipe 20 which is connected to a scrubber 2, to remove water vapor from the rest of the stream, in a similar way as the equipment of FIG. 1.

In a preferred embodiment, after scrubbing, the top gas comprises from 40 to 75 vol % of $H_2$, from 0 to 30 vol % of carbon monoxide CO, from 0 to 10 vol % of methane $CH_4$, from 0 to 25 vol % of carbon dioxide $CO_2$, up to 5 vol % of $H_2O$, the remainder being nitrogen $N_2$. It is preferred to have, after scrubbing, a ratio of $H_2/N_2$ from 1.5 to 3 in such top gas.

The scrubbed gas can then be sent to one of the inlet of a mixer 4 through a connecting pipe 21.

The other inlet of said mixer 4 is connected to the outlet of a plasma torch 40 to incorporate the hydrogen produced by cracking of the methane coming from the methane supply 41.

After being mixed, the reduction gas can optionally be heated through heating means provided to the mixer, such heating means being powered by $CO_2$ neutral electricity. In a preferred embodiment, the temperature of the reduction gas is set to a range from 700° ° C. to 1000° C., preferably from 800 to 1000° C.

The reduction gas made of top gas and hydrogen is then sent back to the DRI shaft, preferably in its reduction section through a pipe 11.

In a preferred embodiment, the ratio of top gas to hydrogen is set from 5:1 to 1:5, preferably from 2:1 to 1:2. Such ratio is notably defined to control the respective amounts of $H_2$ and CO in the reduction stream. When the proportion of CO must be increased, the proportion of top gas in the reduction gas will be increased. When the proportion of $H_2$ must be increased, the proportion of top gas in the reduction gas will be decreased.

To increase the carbon content of the Direct reduced Iron, an additional source of carbon can be injected in the transition section 50 and/or in the cooling section. Such additional source of carbon can be in a gaseous form and/or in a solid form and can, for example, consists of biogas and/or of bio-coal. It is also possible to use the solid carbon formed as a by-product of the plasma conversion of methane as such additional source of carbon or even as the sole source of carbon to set the carbon content of the Direct reduced Iron.

In a preferred embodiment, the carbon content of the Direct Reduced Iron is set from 0.5 to 5 wt. %, preferably from 1 to 3 wt. % or from 2 to 3 wt. %, which allows getting a Direct Reduced Iron that can be easily handled and that keeps a good combustion potential for its future use.

By using the method according to the invention, Direct reduced Iron can be manufactured with the appropriate quality and yield, while remaining $CO_2$ neutral and taking optimal advantage of green resources like intermittent $CO_2$ neutral electricity from renewable sources.

What is claimed is:

1. A method for manufacturing Direct Reduced Iron, the method comprising:

reducing iron ore in a DRI shaft by a reducing gas including hydrogen obtained by thermal cracking of methane inside a plasma torch, the reducing gas further including top gas coming from the DRI shaft, the top gas being scrubbed to remove water before being added to the reducing gas.

2. The method as recited in claim 1 wherein the hydrogen is mixed with the top gas before being injected in the DRI shaft.

3. The method as recited in claim 2 wherein the reducing gas is heated after mixing of the top gas with the hydrogen.

4. The method as recited in claim 3 wherein the heating of the reducing gas is performed using $CO_2$ neutral electricity.

5. The method as recited in claim 1 wherein the reducing gas is injected in the DRI shaft in a reduction section.

6. The method as recited in claim 1 wherein a ratio of top gas to hydrogen is set from 5:1 to 1:5.

7. The method as recited in claim 6 wherein a carbon content of the Direct Reduced Iron is set from 0.5 to 5 wt. %.

* * * * *